(12) United States Patent
Veige

(10) Patent No.: US 11,807,694 B2
(45) Date of Patent: Nov. 7, 2023

(54) MACROCYCLIC POLY(AKANE)S AND POLY(ALKANE-CO-ALKENE)S

(71) Applicant: UNIVERSITY OF FLORIDA RESEARCH FOUNDATION, INC., Gainesville, FL (US)

(72) Inventor: Adam S. Veige, Gainesville, FL (US)

(73) Assignee: UNIVERSITY OF FLORIDA RESEARCH FOUNDATION, INCORPORATED, Gainesville, FL (US)

(*) Notice: Subject to any disclaimer, the term of this patent is extended or adjusted under 35 U.S.C. 154(b) by 660 days.

(21) Appl. No.: 16/648,159

(22) PCT Filed: Aug. 24, 2018

(86) PCT No.: PCT/US2018/047936
§ 371 (c)(1),
(2) Date: Mar. 17, 2020

(87) PCT Pub. No.: WO2019/060090
PCT Pub. Date: Mar. 28, 2019

(65) Prior Publication Data
US 2020/0255560 A1    Aug. 13, 2020

Related U.S. Application Data

(60) Provisional application No. 62/561,941, filed on Sep. 22, 2017.

(51) Int. Cl.
| | | |
|---|---|---|
| *C08F 110/06* | (2006.01) | |
| *C08F 138/00* | (2006.01) | |
| *C08F 110/14* | (2006.01) | |
| *C08G 61/08* | (2006.01) | |

(52) U.S. Cl.
CPC .......... *C08F 110/06* (2013.01); *C08F 110/14* (2013.01); *C08F 138/00* (2013.01); *C08G 61/08* (2013.01); *C08F 2500/25* (2013.01); *C08G 2261/418* (2013.01); *C08G 2261/419* (2013.01); *C08G 2261/724* (2013.01)

(58) Field of Classification Search
CPC .. C08F 110/06; C08F 138/00; C08F 2500/25; C08F 110/14; C08G 61/08; C08G 2261/418; C08G 226/419; C08G 2261/724
See application file for complete search history.

(56) References Cited

U.S. PATENT DOCUMENTS

| | | | |
|---|---|---|---|
| 3,963,792 | A | 6/1976 | Takeshita |
| 6,946,533 | B2 | 9/2005 | Grubbs et al. |
| 9,206,266 | B2 | 12/2015 | Veige et al. |
| 2004/0132934 | A1 | 7/2004 | Grubbs et al. |
| 2012/0157725 | A1 | 6/2012 | McAuliffe |
| 2014/0309389 | A1 | 10/2014 | Veige et al. |
| 2016/0215089 | A1* | 7/2016 | Tuba ..................... C08G 61/08 |

FOREIGN PATENT DOCUMENTS

| | | | |
|---|---|---|---|
| JP | 49-017427 B1 | 4/1974 | |
| JP | 50-047943 A | 4/1975 | |
| JP | 50-011901 B1 | 5/1975 | |
| JP | 2005-534777 A | 11/2005 | |
| JP | 2017-524756 A | 8/2017 | |
| WO | 1998/39405 A1 | 9/1998 | |
| WO | 2013/085707 A1 | 6/2013 | |
| WO | 2015/191571 A1 | 12/2015 | |
| WO | WO-2015191571 A1 * | 12/2015 | .............. C08F 30/08 |
| WO | 2016/058062 A1 | 4/2016 | |

OTHER PUBLICATIONS

Chang et al., Recent Progress on the Synthesis of Cyclic Polymers via Ring-Expansion Strategies, Journal of Polymer Science, Part A: Polymer Chemistry 55: 2892-2902 (2017).
International Application No. PCT/US18/47936, International Preliminary Report on Patentability, dated Apr. 2, 2020.
International Application No. PCT/US18/47936, International Search Report and Written Opinion, dated Oct. 17, 2018.
Pubchem CID 520449, pp. 1-7, Create Date: Sep. 13, 2017; p. 3, see 20 structure.
Pubchem CID 5379442, pp. 1-12, Create Date: Mar. 28, 2005; pp. 4-5, see 20 structure.
Pubchem CID 53881691, pp. 1-14, Create Date: Dec. 4, 2011; p. 4, see 20 structure.
Roland et al., Cyclic polymers from alkynes, Nat. Chem., 8:791-796 (2016).
Gonsales et al., Highly tactic cyclic polynorbornene: stereoselective ring expansion metathesis polymerization of norbornene catalyzed by a new tethered tungsten-alkylidene catalyst, J. Am. Chem. Soc., 138:4996-4999 (2016).
Singapore Application No. 11202002388P, Singapore Search Report and Written Opinion, dated Jun. 18, 2021.
Anonymous: PubChem compound Summary CID520449|C24H48 Database Pubchem compound XP055584099. URL: https://pubchem.ncbi.nlm.nih.gov/compound/520449, (2005).

(Continued)

*Primary Examiner* — Robert D Harlan
(74) *Attorney, Agent, or Firm* — MARSHALL, GERSTEIN & BORUN LLP

(57) ABSTRACT

Macrocyclic polyalkene homopolymers and copolymers can be formed and converted to macrocyclic polyalkanes or macrocyclic poly(alkane-co-alkene) upon hydrogenation or, when the macrocyclic polyalkene is reacted with an alkene in the presence of an olefin metathesis catalyst, to a macrocyclic poly(alkane-co-alkene) comprising vicinal —C(=CR2)—'s. Upon hydrogenation of a macrocyclic poly(alkane-co-alkene) comprising vicinal —C(=CR2)-'s, macrocyclic poly(alkane)s or poly(alkane-co-alkene)s with isolated —C(=CR2)- groups can be provided, depending on the degree of hydrogenation. The poly(alkane-co-alkene)s with isolated —C(=CR2)- units can be used to form poly(macrocyclic poly(alkane-co-alkene))s, poly(macrocyclic poly(alkane))s, and/or bi-, tri-, and/or multi-macrocyclic poly(alkane-co-alkene)s or bi-, tri-, and/or multi-macrocyclic poly(alkane)s.

20 Claims, 2 Drawing Sheets

(56) References Cited

OTHER PUBLICATIONS

Bielawski et al., Synthesis of Cyclic Polybutadiene via Ring Opening Metathesis Polymerization: The Importance of Removing Trace Linear Contaminants, Journal of the American Chemical Society, 125(28):8424-8425 (2003).
Ivin et al., Ring-Opening Metathesis Polymerization: General Aspects in Olefin Metathesis and Metathesis Polymerization, Acadenic Press, San Diego London Boston New York sydney Tokyo Toronto, XP055193390, 224-231 (1997).
Pubchem:1,2,3-Trimethylcyclododeca-1,3,5-triene, XP055801539, Retrieved from the Internet: URL:https://pubchem.ncbi.nlm.nih.gov/compound/1_2_3-Trimethylcyclododeca-1_3_5-triene (2011).

* cited by examiner

MACROCYCLIC POLY(AKANE)S AND POLY(ALKANE-CO-ALKENE)S

CROSS-REFERENCE TO RELATED APPLICATIONS

This application claims the priority benefit under 35 U.S.C. § 119(e) of U.S. Provisional Application No. 62/561,941, filed Sep. 22, 2017, the entire disclosure of which is incorporated herein by reference.

STATEMENT OF GOVERNMENT SUPPORT

This invention was made with government support under CHE-1506850 awarded by the National Science Foundation. The government has certain rights in the invention.

FIELD

The disclosure relates generally to cyclic polymers. In particular, the disclosure relates to macrocyclic polyalkenes, macrocyclic polyalkenes, and macrocyclic poly(alkane-co-alkene) s.

BACKGROUND

Cyclic polymers, or macrocycles, differ in their structure and properties to their equivalent molecular weight linear counterparts due to the absence of chain-ends. These differences are observed in solution and in bulk. These differences include smaller hydrodynamic volume and radius of gyration ($R_g$), higher glass transition temperature ($T_g$), lower intrinsic viscosity, higher critical solution temperature, increased rate of crystallization, and higher refractive index. The presence of a small amount of linear polymer can dramatically alter the measured polymer properties.

Synthetic approaches towards cyclic polymers have been a long-term goal for polymer chemists. Few efficient and scalable synthetic strategies for cyclic polymers are known. In general, cyclic polymers are typically synthesized by two different approaches: ring-closure reaction of end-functional linear polymer precursors; and ring-expansion polymerization involving ring-opening or polycondensation reactions of small building blocks or monomers. Ring-closure has been performed in dilute solution and often has significant amounts of linear polymer impurities. Ring-expansion metathesis polymerization (REMP) is a powerful means for preparing cyclic polymers, where ruthenium (Ru)-based metathesis catalysts are used to produce cyclic polymers directly from cyclic monomers. Because cyclic polymers remain intact during the entire process, REMP can generate high MWs cyclic polymers in concentrated solution or in bulk. Among the cyclic polymers that have been prepared are poly(valerolactone), poly(caprolactone), poly(t-butyl acrylate), polystyrene, poly(N-isopropyl acrylamide), poly (azo-methyl acrylate), poly(isobutylene), poly(4-vinylbenzyl-carbazole), poly(methylmethacrylate) poly(tetrahydrofuran), poly(lactide), poly(ethylene oxide), poly (cyclooctene), poly(5-acetoxy-1-cyclooctene), poly (cyclododecatriene), poly(exo-5-norbornene-carboxylic acid pentafluorophenol ester), poly(butyrolactone), poly(N-carboxyanhydride), poly(styrene-co-methyl acrylate), poly (methylacrylate), poly(thiirane), poly(methylene), poly(norbornene)-g-polystyrene, poly(norbornene)-g-poly(lactide), poly(norbornene)-g-poly(n-butyl acrylate), poly(norbornene)-g-poly(ethylene oxide) and poly(N-carboxyanhydride)-g-poly(ethylene oxide).

Recently, Veige et al. U.S. Pat. No. 9,206,266 has demonstrated the polymerization of acyclic alkynes to cyclic polyalkenes, for example, cyclic poly(phenylacetylene), using a pincer ligand supported metallocycloalkylene tungsten complex. As the initial and terminal ends are bound to the complex, chain-termination and chain transfer occurs with coupling of the initial and terminal ends to form a cyclic topology. Polymerization occurs in high yield and high selectivity of cyclization. Extension of this technology to polyalkanes, such as the production of cyclic polypropylene, is desirable.

SUMMARY

Provided herein are macrocyclic polyalkene copolymers that are a conjugated polyalkene having no chain ends and in the form of a macrocycle, comprising at least two different repeating units have the structure —RC=CR—. The R groups are independently: H; a substituted or unsubstituted $C_1$ to $C_{30}$ alkyl, provided that when all R are an unsubstituted $C_1$ to $C_{30}$ alkyl, at least one R is not a $C_4$, $C_6$, $C_7$, or $C_{13}$ alkyl; substituted or unsubstituted $C_3$ to $C_{30}$ alkenyl having one or more alkene bonds where a plurality of alkene bonds can be non-conjugated, conjugated, or a mixture thereof; or where two R groups are combined as a $C_8$-$C_{30}$ cycloalkene where the alkylene portion of the cycloalkene is substituted or unsubstituted and/or interrupted one or more times with O, NR', C(O), C(O)O, and/or C(O)NR", where R' and/or R", when present are each independently H, $C_{1-30}$ alkyl, or $C_3$ to $C_{30}$ alkenyl. The macrocyclic polyalkene copolymer can have a structure of

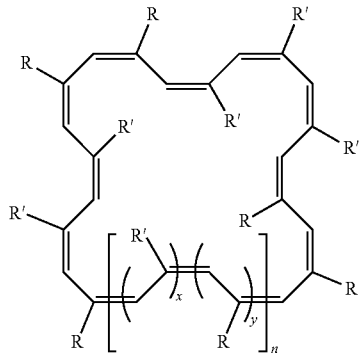

wherein R and R' in the structure are each independently an R as defined in claim 1, and each of n, x, and y is independently an integer of 1 to 100.

In some cases, provided herein are macrocyclic polyalkanes or macrocyclic poly(alkane-co-alkene)s that include alkane repeating units have the structure —RHC—CHR— and, optionally, alkene repeating units have the structure —RC=CR— or —C(=CR$_2$)—'s, where, if present, the R of the —RC=CR— alkene repeating units are the same as the R units of at least one of the alkane repeating units. The R groups are independently: H; a substituted or unsubstituted $C_1$ to $C_{30}$ alkyl, or, when absent an alkene repeating unit or comprising exclusively one unsubstituted alkane repeating units or a copolymer with —H$_2$C—CH$_2$— repeating units, R is $C_{1-3}$, $C_5$, $C_{8-12}$, or $C_{14-30}$; substituted or unsubstituted $C_3$ to $C_{30}$ alkenyl having one or more alkene bonds where a plurality of alkene bonds can be non-conjugated, conjugated, or a mixture thereof; or where two R groups are combined as a $C_8$-$C_{30}$ cycloalkane and/or cycloalkene where the alkylene portion of the cycloalkane and/or alkene is substituted or unsubstituted and/or interrupted one or more times with O, NR', C(O), C(O)O, and/or C(O)NR", where R' and/or R", when present, are each independently H, $C_{1-30}$ alkyl, $C_3$ to $C_{30}$ alkenyl. In embodiments, the macrocyclic polyalkane or macrocyclic poly(alkane-co-alkene) can have a structure

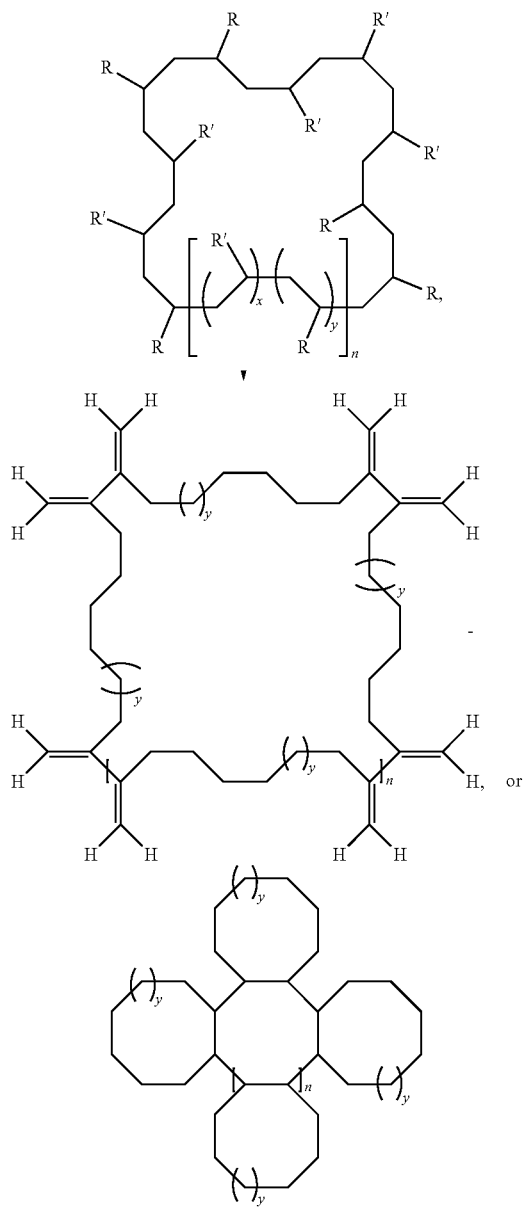

wherein R and R' in the first structure are each independently an R as defined above, the H atoms depicted in the second structure can be H or another R group as defined above, and each of n, x, and y is an integer of 1 to 100.

Further provided are methods of forming a macrocyclic polyalkane or a macrocyclic poly(alkane-co-alkene) by reacting a macrocyclic polyalkene and hydrogen in the presence of a hydrogenation catalyst to form the polyalkane or poly(alkane-co-alkene), and isolating the macrocyclic polyalkane or macrocyclic poly(alkane-co-alkene).

Also provided are methods of forming a macrocyclic polyalkane or a macrocyclic poly(alkane-co-alkene) by reacting a macrocyclic poly(cycloalkene) with an excess of an alkene and an olefin metathesis catalyst thereby forming a macrocyclic poly(alkane-co-alkene) comprising vicinal —C(=CR$_2$)— groups, and optionally isolating the macrocyclic polyalkane or the macrocyclic poly(alkane-co-alkene) comprising —C(=CR$_2$)— groups. The macrocyclic polyalkane or the macrocyclic poly(alkane-co-alkene) comprising —C(=CR$_2$)— groups can be reacted with hydrogen in the presence of a hydrogenation catalyst thereby forming a macrocyclic polyalkane or a macrocyclic poly(alkane-co-alkene) comprising isolated —C(C=CR$_2$) groups. The macrocyclic poly(alkane-co-alkene) comprising isolated —C(=CR$_2$)— groups can react in the presence of an olefin metathesis catalyst to condense isolated —C(=CR$_2$)— groups intermolecularly into a poly(macrocyclic poly(alkane-co-alkene)) comprising C=C links between macrocyclic poly(alkane-co-alkene). The poly(macrocyclic poly(alkane-co-alkene)) can be hydrogenated to form a poly(macrocyclic poly(alkane)). A dilute solution of the macrocyclic poly(alkane-co-alkene) comprising isolated —C(=CR$_2$)— groups can be combined with an olefin metathesis catalyst and condensed to form bi-macrocyclic, tri-macrocyclic and/or multi-macrocyclic poly(alkane-co-alkene)s. The bi-macrocyclic, tri-macrocyclic and/or multi-macrocyclic poly(alkane-co-alkene)s can be hydrogenated to form bi-macrocyclic, tri-macrocyclic and/or multi-macrocyclic poly(alkane)s.

Further aspects and advantages will be apparent to those of ordinary skill in the art from a review of the following detailed description, taken in conjunction with the drawings. The description hereafter includes specific embodiments with the understanding that the disclosure is illustrative, and is not intended to limit the invention to the specific embodiments described herein.

DETAILED DISCLOSURE

Figure 1:
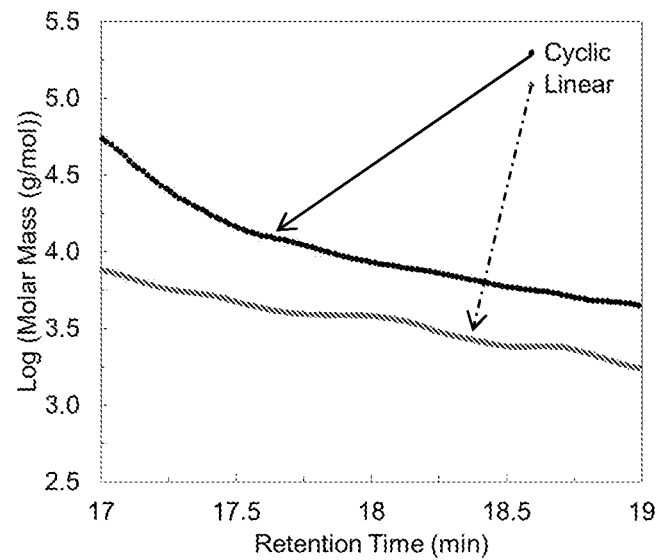
FIG. 1 is a plot of the log of molecular weight versus elution volume for atactic linear and cyclic polypropylene formed from hydrogenation of cyclic poly(propyne) according to an embodiment of the invention.

Disclosed herein are macrocyclic poly(alkenes), macrocyclic poly(alkenes-co-alkanes), and macrocyclic poly(alkanes).

Provided are macrocyclic polyalkene copolymers that are conjugated polyalkenes having no chain ends and are in the form of a macrocycle comprising two or more repeating units have the structure —RC=CR—. As used herein, a polymer "having no chain ends" refers to a polymer wherein the initiating monomer/group is linked to the terminating monomer/group. In some cases, the macrocyclic polyalkanes or macrocyclic poly(alkane-co-alkene)s include alkane repeating units have the structure —RHC—CHR— and, optionally, alkene repeating units have the structure —RC=CR— or are pairs of vicinal —C(=CR$_2$)—'s, where the R of the —RC=CR— alkene repeating units are the same as the R units of at least one of the alkane repeating units.

The R groups of the foregoing can be independently: H; a substituted or unsubstituted $C_1$ to $C_{30}$ alkyl, or, when absent an alkene repeating unit or comprising exclusively one unsubstituted alkane repeating units or a copolymer with —$H_2C$—$CH_2$— repeating units, R is $C_{1-3}$, $C_5$, $C_{8-12}$, or $C_{14-30}$ alkyl; substituted or unsubstituted $C_3$ to $C_{30}$ alkenyl having one or more alkene bonds where a plurality of alkene bonds can be non-conjugated, conjugated, or a mixture thereof; substituted or unsubstituted $C_{10}$ to $C_{30}$ aryl; substituted or unsubstituted $C_7$ to $C_{30}$ alkylaryl where at least one $C_6$ to $C_{30}$ aryl group is combined with at least one $C_1$ to $C_{30}$ alkyl group and where an alkyl or an aryl carbon can be bonded to the alkyne group; or where the two R groups are combined as a $C_8$-$C_{30}$ cycloalkane and/or cycloalkene where the alkylene portion of the cycloalkane and/or cycloalkene is substituted or unsubstituted and/or interrupted one or more times with O, NR' or any protected equivalent thereof, C(O) or any protected equivalent thereof, C(O)O or any protected equivalent thereof, and/or C(O)NR" or any protected equivalent thereof, where R' and/or R" is H, $C_{1-30}$ alkyl, $C_3$ to $C_{30}$ alkenyl, $C_6$ to $C_{30}$ aryl, or $C_7$ to $C_{30}$ alkylaryl.

In some cases, the macrocyclic polyalkane or macrocyclic poly(alkane-co-alkene) is a macrocyclic polypropylene or poly(propene-co-propyne). In other embodiments of the invention, the macrocyclic polyalkane or macrocyclic poly (alkane-co-alkene) has substituted $C_1$ to $C_{30}$ alkyl, substituted $C_3$ to $C_{30}$ alkenyl, and/or substituted $C_{10}$ to $C_{30}$ aryl, substituted on the resulting cyclic poly(alkynes) is hydroxy, $C_2$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $NH_2$, $C_3$-$C_{30}$ alkylamino, $C_6$-$C_{14}$ arylamino, $C_7$-$C_{30}$ (arylalkyl) amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino, $C(O)NH_2$ ("amido"), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl) amido, $C_{15}$-$C_{30}$ di(arylalkyl)amido, $C_9$-$C_{30}$ alkyl(arylalkyl) amido, $C_{16}$-$C_{30}$ aryl(arylalkyl)amido, thiol, $C_2$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, or any protected equivalent thereof.

The macrocyclic poly(alkane-co-alkene) can have vicinal —C(═$CR_2$)—'s. The macrocyclic polyalkane or macrocyclic poly(alkane-co-alkene) can have vicinal —C($CHR_2$)—'s. The macrocyclic polyalkane or macrocyclic poly(alkane-co-alkene) can have $C_8$-$C_{30}$ cycloalkane repeating units. The macrocyclic poly(alkane-co-alkene) can have C═C bridges between macrocyclic poly(alkane-co-alkene) forming a poly(macrocyclic poly(alkane-co-alkene)). The macrocyclic poly(alkane-co-alkene) can have C═C bridges between repeating units of a single macrocyclic poly(alkane-co-alkene) forming bi-macrocyclic, tri-macrocyclic and/or multi-macrocyclic poly(alkane-co-alkene)s.

The disclosure further provides cyclic poly(alkyne) polymers and copolymer and their preparation wherein alkyne monomers are polymerized or copolymerized to the cyclic poly(alkyne), a macrocyclic poly(alkene). The macrocyclic poly(alkene) can be prepared by the polymerization or copolymerization of two or more alkyne monomers of the structure RCCR where R is independently: H; a substituted or unsubstituted $C_1$ to $C_{30}$ alkyl; substituted or unsubstituted $C_3$ to $C_{30}$ alkenyl having one or more alkene bonds where a plurality of alkene bonds can be non-conjugated, conjugated, or a mixture thereof; substituted or unsubstituted $C_{10}$ to $C_{30}$ aryl; substituted or unsubstituted $C_7$ to $C_{30}$ alkylaryl where at least one $C_6$ to $C_{30}$ aryl groups are combined with at least one $C_1$ to $C_{30}$ alkyl group and where an alkyl or an aryl carbon can be bonded to the alkyne group; or where the two R groups are combined as a $C_8$-$C_{30}$ cycloalkyne where the alkylene portion of the cycloalkyne is substituted or unsubstituted and/or interrupted one or more times with O, NR', C(O), C(O)O, and/or C(O)NR", where R' and/or R" is H, $C_{1-30}$ alkyl, $C_3$ to $C_{30}$ alkenyl, $C_6$ to $C_{30}$ aryl, or $C_7$ to $C_{30}$ alkylaryl. Substituents on the resulting cyclic poly(alkynes) can be hydroxy, $C_2$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $NH_2$, $C_3$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino, $C(O)NH_2$, $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, or $C_3$-$C_{30}$ polyamidoester.

In preparation of the cyclic poly(alkene), hydroxyl groups on the monomers can be unprotected or protected as the derivative of the functionality: acetyl; benzoyl; benzyl; β-methoxyethoxymethyl ether; methoxymethyl ether; p-methoxybenzyl ether; methylthiomethyl ether; tetrahydropyranyl; tetrahydrofuran; trityl; trimethylsilyl; tert-butyldimethylsilyl; tri-iso-propylsilyloxymethyl; triisopropylsilyl; methyl ether; ethoxyethyl ether; or protected in any other manner. In preparation of the cyclic poly(alkenyl); amine groups on the monomers can be unprotected or protected as the derivative of the functionality: carbobenzyloxy; p-methoxybenzyl carbonyl; tert-butyloxycarbonyl; 9-fluorenylmethyloxycarbonyl; benzyl; p-methoxybenzyl; 3; 4-dimethoxybenzyl; or protected in any other manner. In preparation of the cyclic poly(alkenyl); carboxylic acid groups on the monomers can be unprotected or protected as the derivative of the functionality: methyl esters; benzyl esters; tert-butyl esters; esters of 2; 6-disubstituted phenols; silyl esters orthoesters. Accordingly, as used herein a "protected equivalent" refers to a protected hydroxyl, protected amine, or protected carboxylic acid as described herein.

The polymerization or copolymerization of the cyclic poly(alkene) can be carried out as disclosed in Veige et al. U.S. Pat. No. 9,206,266, the entirety of which is incorporated by reference herein. The polymerization or a copolymerization, according to an embodiment of the invention, can be carried out at room temperature (e.g., in a range of 20° C. to 25° C.) or warmed to temperatures of 75° C. or greater, for example, but not limited to, 75° C. to 200° C., or 100° C. to 175° C., or 100 to 150° C., for example, 75° C., 80° C., 85° C., 90° C., 95° C., 100° C., 105° C. 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., or 200° C. Polymerization or copolymerization can be carried out in solution using an aprotic solvent or in the absence of solvent, e.g., neat. Suitable aprotic solvents include, but are not limited to, toluene, dichloromethane, diethylether, cyclohexane, and hexanes. Reaction times are very short, with polymers produced in as little as 1 minute, for example, 1 minute to 1 hour, 1 minute to 30 minutes, 2 minutes to 15 minutes, or 2 minutes to 10 minutes.

Copolymerization can be carried out using a mixture of monomers having two or more structures, as illustrated below in Scheme 1 for a copolymerization of two acyclic monomers. Acetylene, or an alkyne monomer (for example, but not limited to, trimethylsilylacetylene), can be employed as one of the monomers. Scheme 1 below shows the reaction of H—C≡C—R monomer and H—C≡C—R' monomer. The amount of the H—C≡C—R monomer needed to form the macrocycle below is ny+5 (e.g., if n is 2 and y is 2, the amount of H—C≡C—R monomer needed is 9). Similarly, the amount of H—C≡C—R' monomer needed to form the macrocycle below is nx+5.

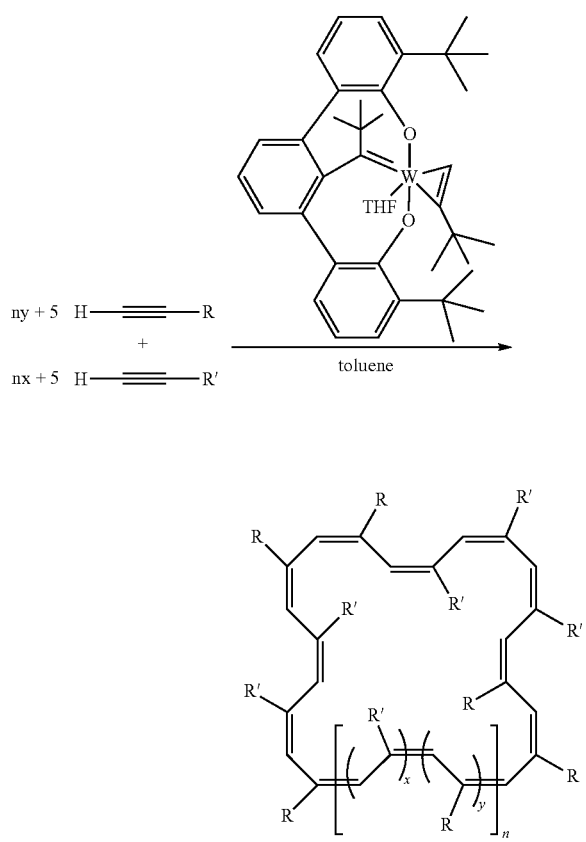

Scheme 1

The copolymer can be a gradient copolymer where two alkynes of unequal reactivity are included in the mixture, wherein the more reactive alkyne is incorporated during the initial polymerization and the less reactive alkyne is incorporated subsequently, and at higher proportions, as the more reactive alkyne becomes depleted in the monomer mixture. When the more reactive and less reactive alkynes are included simultaneously, the concentration of the more reactive alkyne can be controlled by phase separation such that it is initially primarily external to the polymerizing solution, and upon incorporation increases the affinity of the solution for the more reactive monomer causing a gradient that forms by the initial incorporation of the less reactive monomer and subsequently forms a larger proportion of the solubilized more reactive monomer. In the limit, a block copolymer can be formed.

Also provided in the disclosure are methods of forming a macrocyclic polyalkane or a macrocyclic poly(alkane-co-alkene) where a macrocyclic polyalkene is reacted with hydrogen in the presence of a hydrogenation catalyst. The hydrogenation can be of all or a portion of the C=C bonds of the macrocyclic polyalkene. In some embodiments, the macrocyclic poly(cycloalkene) comprises vicinal —C(=CR$_2$)—'s and is hydrogenated to form a macrocyclic polyalkane or a macrocyclic poly(alkane-co-alkene) comprising isolated —C(=CR$_2$)—'s. As used herein, and unless specified otherwise, a —C(=CR$_2$)— is "isolated" when the carbon atoms adjacent to the vicinal group are not also vicinal groups. In embodiments, the macrocyclic poly(alkane-co-alkene) comprising isolated —C(=CR$_2$)—'s can react in the presence of an olefin metathesis catalyst to condense isolated —C(=CR$_2$)—'s intermolecularly into a poly(macrocyclic poly(alkane-co-alkene)) comprising C=C links between macrocyclic poly(alkane-co-alkene). The poly(macrocyclic poly(alkane-co-alkene)) can be hydrogenated to form a poly(macrocyclic poly(alkane)). In embodiments, the poly(macrocyclic poly(alkane-co-alkene)) can react in the presence of an olefin metathesis catalyst to condense isolated —C(=CR$_2$)—'s intramolecularly to form bi-macrocyclic, tri-macrocyclic and/or multi-macrocyclic poly(alkane-co-alkene)s. The bi-macrocyclic, tri-macrocyclic and/or multi-macrocyclic poly(alkane-co-alkene)s can be hydrogenated to form bi-macrocyclic, tri-macrocyclic and/or multi-macrocyclic poly(alkane)s.

The polymers or copolymers can be hydrogenated, as indicated in Scheme 2, below, wherein n(x+y)+10 indicates the minimum molar equivalent of hydrogen needed for complete hydrogenation of the alkene bonds of the macrocyclic polymer. Although no stereochemistry for the hydrogenation is indicated, the hydrogens can be added randomly or in a stereoselective manner. The macrocyclic polymer can be a atactic, syndiotactic, or isotactic polymer depending upon effects of ultimate, penultimate, and antepenultimate repeating unit effects on the hydrogenation active site of hydrogen addition. The hydrogenation can be carried out in solution under a hydrogen pressure, for example, but not limited to, 800 psi, 900 psi, or 1,000 psi. For example, the polymer can be hydrogenated at 90° C. and 1,000 psi in toluene using Pd on carbon. Alternatively, Crabtree's catalyst: [Ir(COD)(py)(PCy$_3$)]$^+$[PF$_6$]$^-$, where COD=cyclooctatetraene, py=pyridine, and Cy=cyclohexane), can be used for hydrogenation of the cyclopolyalkyne at about 1 wt % catalyst in solution, for example, but not limited to, dichloromethane (DCM), with as little as 1 atm of H$_2$, at room temperature to yield fully hydrogenated polymer.

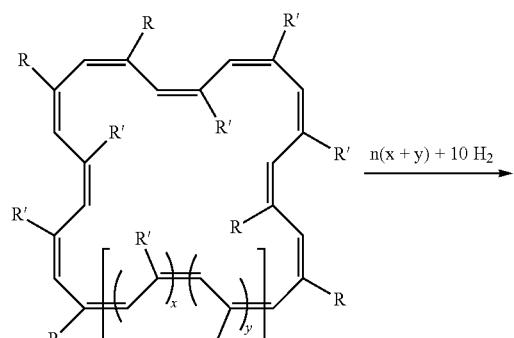

Scheme 2

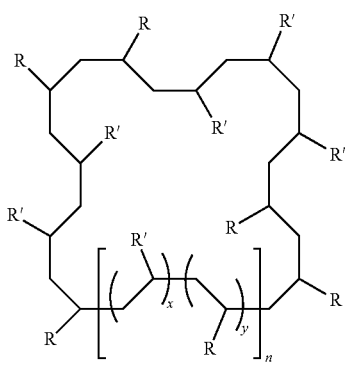

In embodiments, a deficiency of hydrogen can be included in the hydrogenation mixture and the macrocyclic polyalkene can be transformed into a macrocyclic poly(alkene-co-alkane), as indicated in Scheme 3, below, wherein n/2(x+y)+5 molar equivalents of hydrogen are reacted with the macrocyclic polyalkene.

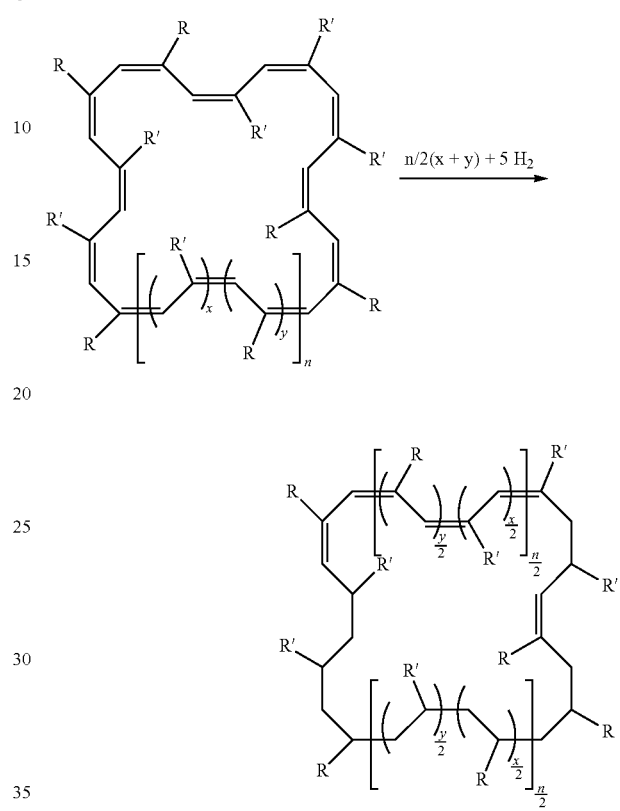

Scheme 3

In embodiments, one or more cyclic alkynes can be polymerized or copolymerized, optionally, with one or more acyclic alkynes, to form a cyclic poly(cycloalkene), as indicated in Scheme 4, below. The macrocyclic poly(cycloalkene) can be hydrogenated to form a macrocyclic poly(cycloalkane) as indicted in Scheme 4, below. The macrocyclic poly(cycloalkene) can be used as a co-reagent for an olefin metathesis using a large excess of ethylene or other alkene, for example, but not limited to a twofold, fourfold, sixfold, eightfold, tenfold, twentyfold, or one hundredfold excess, to form a macrocyclic poly(alkane-co-alkene) that has a larger macrocyclic ring size, as shown in Scheme 4 where the macrocyclic backbone of the macrocyclic poly(alkane-co-alkene) is 7+y times larger than the backbone of the macrocyclic poly(cycloalkene) from which it is formed. The macrocyclic poly(alkane-co-alkene) contains alkene bonds that have only a single carbon on the backbone the macrocycle, situated as vicinal alkenes —C(=CR$_2$)— groups. In Scheme 4, metathesis is illustrated with, but not limited to, the smallest alkene, ethylene. Any metathesis catalyst can be used, including, but not limited to, Grubbs 1$^{st}$ generation, Grubbs 2$^{nd}$ generation, Hoveyda-Grubbs 1$^{st}$ generation, or Hoveyda-Grubbs 2$^{nd}$ generation catalysts. The larger macrocyclic poly(alkane-co-alkene) can be subsequently hydrogenated to form a macrocyclic poly(alkane), as shown in Scheme 4.

Scheme 4

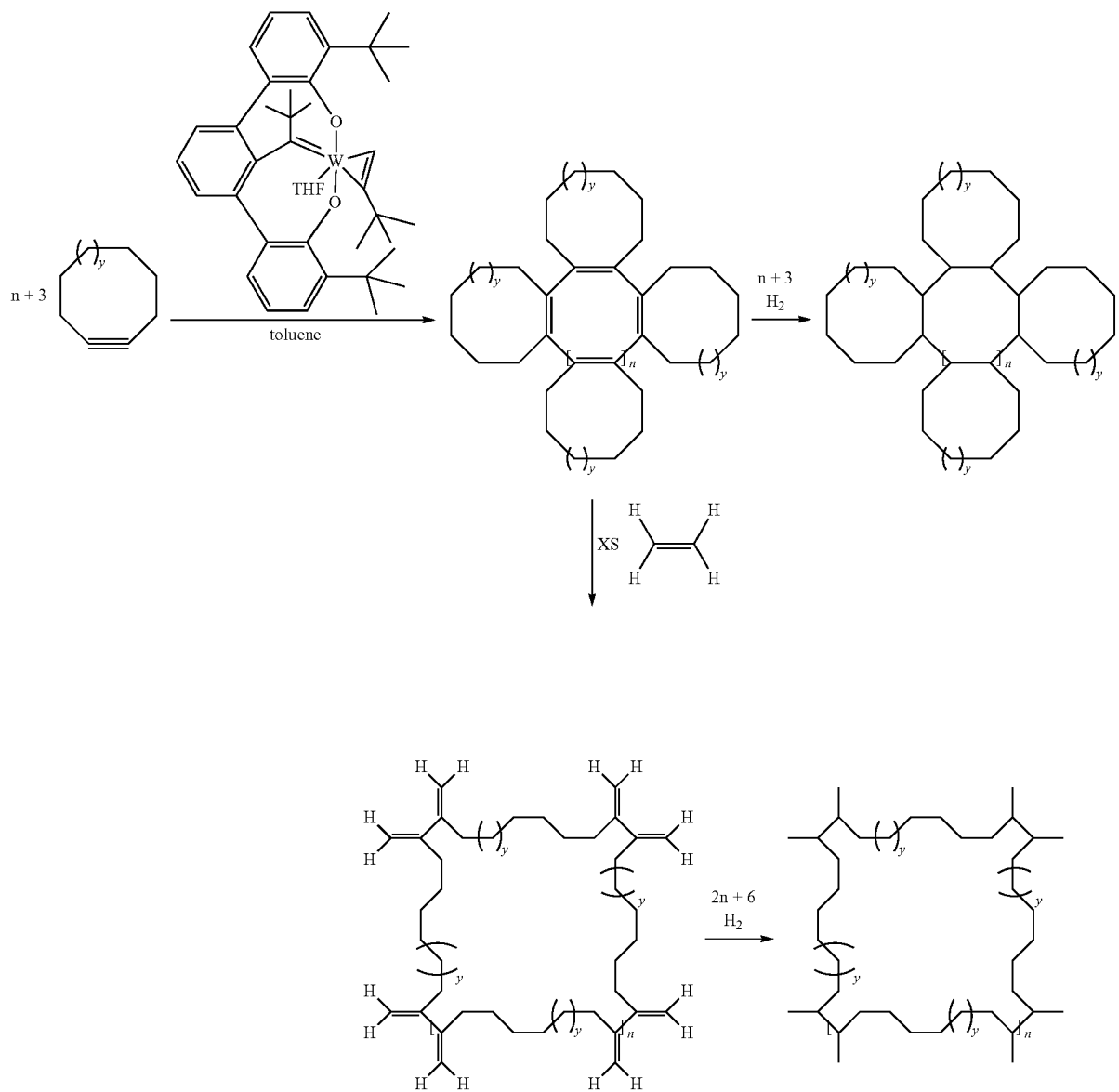

When the macrocyclic poly(alkane-co-alkene) with vicinal —C(=CR$_2$)— groups of larger macrocyclic ring size is only partially hydrogenated, the resulting macrocyclic poly (alkene-co-alkane) has relatively few ene units wherein a majority of the remaining enes are isolated —C(=CR$_2$)— groups. When that macrocyclic poly(alkene-co-alkane) with isolated —C(=CR$_2$)—'s is combined with an olefin metathesis catalyst a poly(macrocyclic polyalkane-co-alkene), as shown in Scheme 5, below, is formed where C=C bridges occur between the macrocyclic poly(alkane-co-alkene) macromers. For clarity of illustration, Scheme 5 is constructed as a linear poly(macrocyclic poly(alkane-co-alkene)) although a hyper-branched structure is most probably formed when the degree of macrocyclic polymerization is larger than two. Depending on the degree of hydrogenation, including non-hydrogenated cyclic polyalkene, the resulting poly macrocyclic polyalkane can be hyper branched or a network can be formed. When the metathesis is carried out in relatively dilute solution, the metathesis can be exclusively intramolecular, forming a bi-macrocyclic, tri-macrocyclic or larger multi-macrocyclic poly(alkane-co-alkene), as shown in Scheme 6, below, where C=C bridges are formed between alkene repeating units of the macrocyclic polyalkane or poly(alkane-co-alkene). Subsequently, hydrogenation of the bi-macrocyclic, tri-macrocyclic or larger multi-macrocyclic poly(alkane-co-alkene) can form a bi-macrocyclic, tri-macrocyclic or larger multi-macrocyclic poly(alkane). The poly (macrocyclic poly(alkane-co-alkene)) of Scheme 5 can contain some bi-macrocyclic, tri-macrocyclic or larger multi-macrocyclic poly(alkane-co-alkene) or have multi-macrocyclic repeating units formed from intramolecular metathesis included in the poly(macrocyclic poly(alkane-co-alkene)).

Scheme 5
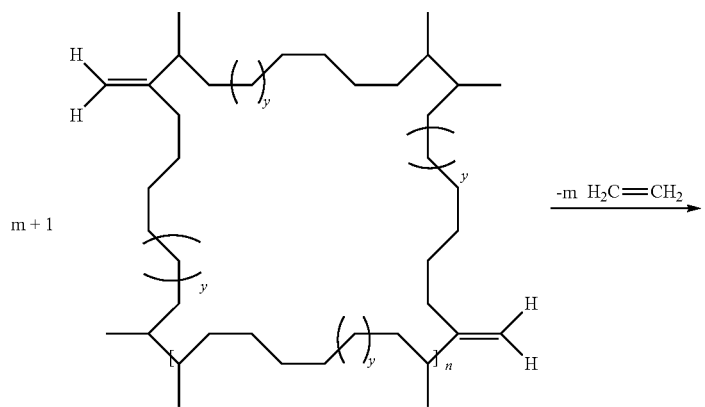
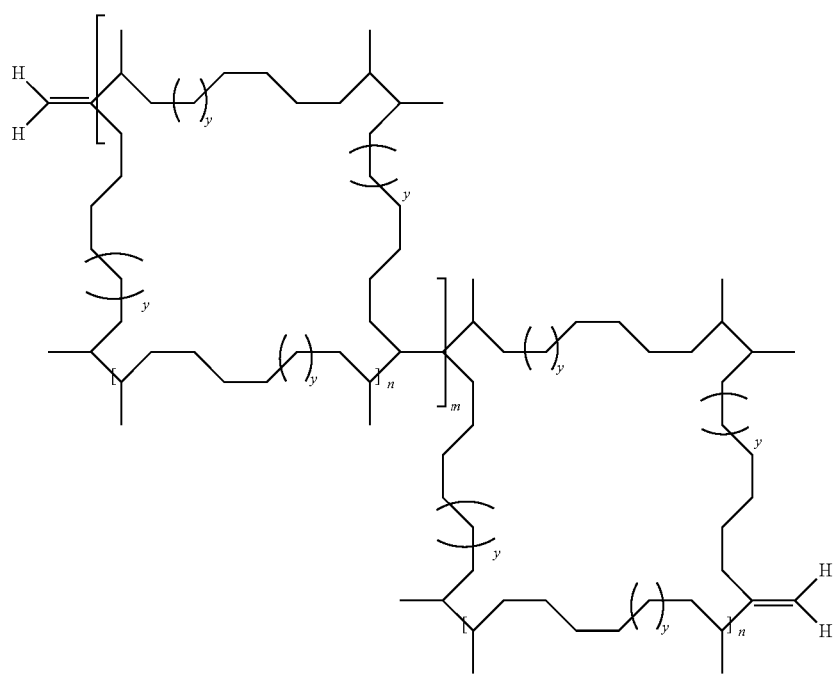
Scheme 6
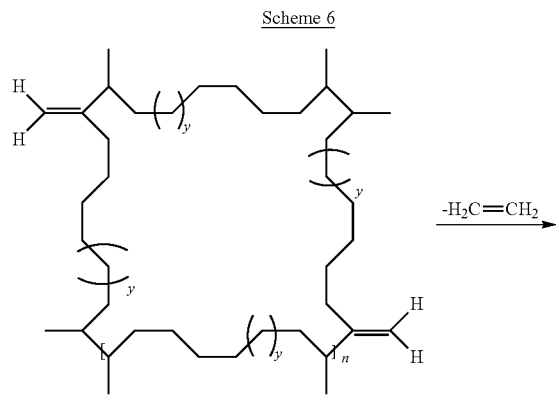
-continued
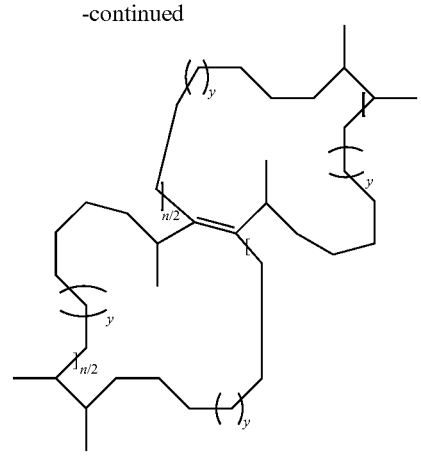

Polymerization Catalyst

The catalyst for carrying out polymerization or copolymerization of the cyclic poly(alkene) can be carried out using a tetra-anionic pincer-ligand supported metallocycloalkylene complex as disclosed in Veige et al. U.S. Pat. No. 9,206,266. A tetra-anionic pincer-ligand supported metallocycloalkylene complex has the following structure:

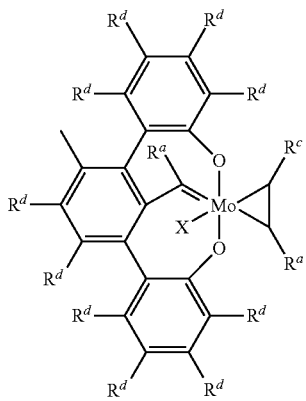

wherein $R^a$ can be independently methyl, ethyl, n-propyl, i-propyl, n-butyl, i-butyl, t-butyl, $C_5$-$C_{22}$ alkyl, phenyl, naphthyl, $C_{13}$-C22 aryl, substituted aryl, or trimethylsilyl; $R^c$ is H or methyl; X is $OR^b{}_n$, $NR^b{}_n$, $SR^b{}_n$, $PR^b{}_n$, or $SeR^b{}_n$; $R^b$ can be independently methyl, ethyl, n-propyl, i-propyl, n-butyl, i-butyl, t-butyl, $C_5$-$C_{22}$ alkyl, phenyl, naphthyl, $C_{13}$-C22 aryl, or two $R^b$ are $C_4$-$C_6$ alkylene combined with a single X as a heterocycle; n is 1 to 3 depending on X; and M can be selected from W, Cr, or Mo in a +6 oxidation state. In embodiments, the metal comprises W.

Figure 3:
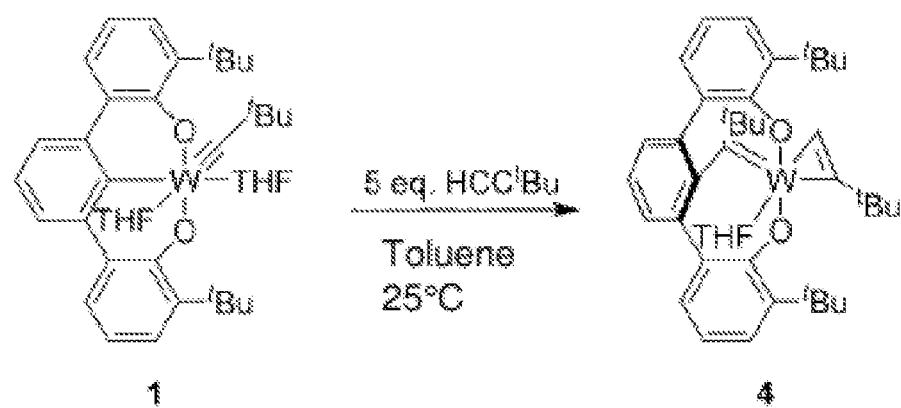
FIG. 3 illustrates the synthesis of a catalyst 4.

As shown in FIG. 3, complex 1 is a precatalyst and can be converted into complex 4 by treating complex 1 with excess 3,3-dimethyl-1-butyne. Complex 4, a catalyst, forms exclusively in quantitative isolable yield.

Specifically contemplated embodiments of the disclosure are herein described in the following paragraphs. These embodiments are intended to be illustrative in nature and not intended to be limiting.

I. A macrocyclic polyalkene copolymer, comprising a conjugated polyalkene having no chain ends and in the form of a macrocycle, including at least two different repeating units have the structure —RC=CR— where R is independently: H; a substituted or unsubstituted $C_1$ to $C_{30}$ alkyl, provided that when all R are an unsubstituted $C_1$ to $C_{30}$ alkyl, at least one R is not a $C_4$, $C_6$, $C_7$, or $C_{13}$ alkyl; substituted or unsubstituted $C_3$ to $C_{30}$ alkenyl having one or more alkene bonds where a plurality of alkene bonds can be non-conjugated, conjugated, or a mixture thereof; or where two R groups are combined as a $C_8$-$C_{30}$ cycloalkene where the alkylene portion of the cycloalkene is substituted or unsubstituted and/or interrupted one or more times with O, NR', C(O), C(O)O, and/or C(O)NR", where R' and/or R", when present are each independently H, $C_{1-30}$ alkyl, or $C_3$ to $C_{30}$ alkenyl.

II. The macrocyclic polyalkene copolymer according to paragraph I, having a structure of:

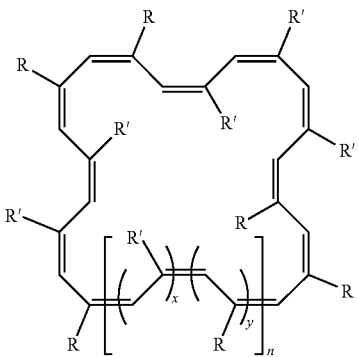

wherein R and R' in the structure are each independently an R as defined in paragraph II, and each of n, x, and y is independently an integer of 1 to 100.

III. The macrocyclic polyalkene copolymer according to paragraph II, wherein each of n, x, and y is independently an integer of 1 to 50.

IV. The macrocyclic polyalkene copolymer according to paragraph II or III, wherein each of n, x, and y is independently an integer of 1 to 25.

V. The macrocyclic polyalkene copolymer according to any one of paragraphs I to IV, wherein at least one R is substituted $C_1$ to $C_{30}$ alkyl, substituted $C_3$ to $C_{30}$ alkenyl, which is substituted with hydroxy, $C_2$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $NH_2$, $C_3$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_5$-$C_{30}$ alkynyl(aryl)amino, $C(O)NH_2$, $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, or $C_3$-$C_{30}$ polyamidoester.

VI. The macrocyclic polyalkene copolymer according to any one of paragraphs I to IV, wherein each R is independently: H; a substituted or unsubstituted $C_1$ to $C_{30}$ alkyl; or a substituted or unsubstituted $C_3$ to $C_{30}$ alkenyl.

VII. The macrocyclic polyalkene copolymer according to any one of paragraphs I to IV, wherein each R is independently H or a substituted or unsubstituted $C_{1-3}$, $C_5$, $C^{8-12}$, or $C_{14-30}$ alkyl.

VIII. A macrocyclic polyalkane or macrocyclic poly(alkane-co-alkene), comprising alkane repeating units have the structure —RHC—CHR— and, optionally, alkene repeating units have the structure —RC=CR— or —C(=$CR_2$)—, where, if present, the R of the —RC=CR— alkene repeating units are the same as the R units of at least one of the alkane repeating units, and where R is independently: H; a substituted or unsubstituted $C_1$ to $C_{30}$ alkyl, or, when absent an alkene repeating unit or comprising exclusively one unsubstituted alkane repeating units or a copolymer with —$H_2C$—$CH_2$— repeating units, R is $C_{1-3}$, $C_5$, $C^{8-12}$, or $C_{14-30}$, substituted or unsubstituted $C_3$ to $C_{30}$ alkenyl having one or more alkene bonds where a plurality of alkene bonds can be non-conjugated, conjugated, or a mixture thereof; or where two R groups are combined as a $C_8$-$C_{30}$ cycloalkane and/or cycloalkene where the alkylene portion of the cycloalkane and/or alkene is substituted or unsubstituted and/or interrupted one or more times with O, NR', C(O), C(O)O, and/or C(O)NR'', where R' and/or R'', when present, are each independently H, $C_{1-30}$ alkyl, $C_3$ to $C_{30}$ alkenyl.

IX. The macrocyclic polyalkane or macrocyclic poly (alkane-co-alkene) according to paragraph VIII, having a structure of

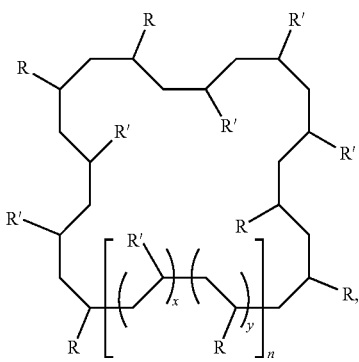

wherein R and R' in the structure are each independently an R as defined in paragraph VIII, and each of n, x, and y is an integer of 1 to 100.

X. The macrocyclic polyalkene copolymer according to paragraph IX, wherein each of n, x, and y is independently an integer of 1 to 50.

XI. The macrocyclic polyalkene copolymer according to paragraph IX or X, wherein each of n, x, and y is independently an integer of 1 to 25.

XII. The macrocyclic polyalkane or macrocyclic poly (alkane-co-alkene) according to any one of paragraphs VIII to XI, wherein at least one R is substituted $C_1$ to $C_{30}$ alkyl, or substituted $C_3$ to $C_{30}$ alkenyl, which is substituted singularly or plurally and each substitution is independently hydroxy, $C_2$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $NH_2$, $C_3$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl) amino, $C_7$-$C_{30}$ di(arylalkyl)amino, $C_8$-$C_{30}$ alkyl(arylalkyl) amino, $C_{15}$-$C_{30}$ aryl(arylalkyl)amino, $C_8$-$C_{30}$ alkenyl(aryl) amino, $C_8$-$C_{30}$ alkynyl(aryl)amino, $C(O)NH_2$, $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester.

XIII. The macrocyclic polyalkane or macrocyclic poly (alkane-co-alkene) according to any one of paragraphs VIII to XI, wherein each R is independently: H; a substituted or unsubstituted $C_1$ to $C_{30}$ alkyl; or a substituted or unsubstituted $C_3$ to $C_{30}$ alkenyl; provided that when all R are an unsubstituted $C_1$ to $C_{30}$ alkyl, at least one R is not a $C_4$, $C_6$, $C_7$, or $C_{13}$ alkyl.

XIV. The macrocyclic polyalkane or macrocyclic poly (alkane-co-alkene) according to any one of paragraphs VIII to XI, wherein each R is independently H or a substituted or unsubstituted $C_{1-3}$, $C_5$, $C_{8-12}$, or $C_{14-30}$ alkyl.

XV. The macrocyclic polyalkane or macrocyclic poly (alkane-co-alkene) according to any one of paragraphs VIII to XI, wherein the macrocyclic polyalkane has $C_8$-$C_{30}$ cycloalkane repeating units.

XVI. The macrocyclic polyalkane or macrocyclic poly (alkane-co-alkene) according to any one of paragraphs VIII to XI, wherein the macrocyclic polyalkane is macrocyclic polypropylene.

XVII. The macrocyclic polyalkane or macrocyclic poly (alkane-co-alkene) according to any one of paragraphs VIII to XI, wherein the macrocyclic poly(alkane-co-alkene) comprises vicinal —C(=$CR_2$)— groups.

XVIII. The macrocyclic polyalkane or macrocyclic poly (alkane-co-alkene) according to paragraph XVII, having a structure

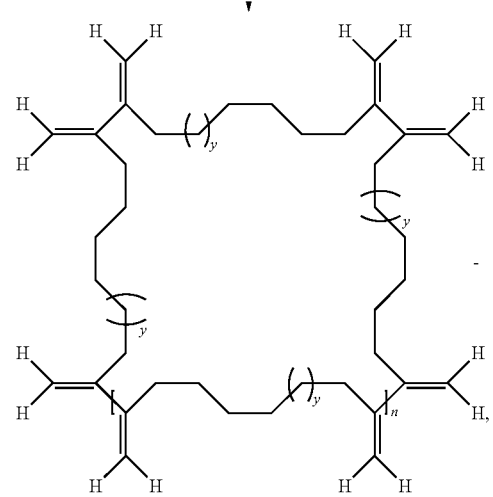

wherein the H atoms depicted in the structure can be H or another R group as defined in paragraph VIII, and each of n and y is an integer of 1 to 100.

XIX. The macrocyclic polyalkane or macrocyclic poly (alkane-co-alkene) according to paragraph XVIII, wherein each y is independently an integer of 1 to 20 and n is an integer of 1 to 50.

XX. The macrocyclic polyalkane or macrocyclic poly (alkane-co-alkene) according to VIII or XIX, wherein each y is independently an integer of 1 to 10 and n is an integer of 1 to 25.

XXI. The macrocyclic polyalkane or macrocyclic poly (alkane-co-alkene) according to any one of paragraph XVIII to XX, wherein each y is independently an integer of 1 to 5 and n is an integer of 1 to 10.

XXII. The macrocyclic polyalkane or macrocyclic poly(alkane-co-alkene) according to any one of paragraphs VIII to XXI, wherein the macrocyclic polyalkane or macrocyclic poly(alkane-co-alkene) comprises vicinal —C(CHR$_2$)— groups.

XXIII. The macrocyclic polyalkane or macrocyclic poly(alkane-co-alkene) according to any one of paragraphs XVIII to XXII, wherein each R is independently: H; a substituted or unsubstituted C$_1$ to C$_{30}$ alkyl; or a substituted or unsubstituted C$_3$ to C$_{30}$ alkenyl.

XXIV. The macrocyclic polyalkane or macrocyclic poly(alkane-co-alkene) according to any one of paragraphs XVIII to XXII, wherein each R is independently H or a substituted or unsubstituted C$_{1-3}$, C$_5$, C$^{8-12}$, or C$_{14-30}$ alkyl.

XXV. The macrocyclic polyalkane or macrocyclic poly(alkane-co-alkene) according to any one of paragraphs XVIII to XXII, wherein the macrocyclic polyalkane has C$_8$-C$_{30}$ cycloalkane repeating units in the polymer backbone.

XXVI. The macrocyclic polyalkane or macrocyclic poly(alkane-co-alkene) according to paragraph XXV having a structure:

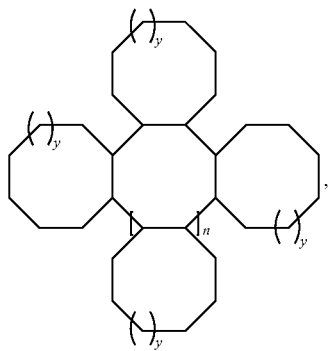

wherein each y and n are independently integers from 1 to 100.

XXVII. The macrocyclic polyalkane or macrocyclic poly(alkane-co-alkene) according to paragraph XXVI, wherein each y is independently an integer of 1 to 20 and n is an integer of 1 to 50.

XXVIII. The macrocyclic polyalkane or macrocyclic poly(alkane-co-alkene) according to paragraphs XXV or XXVI, wherein each y is independently an integer of 1 to 10 and n is an integer of 1 to 25.

XXIX. The macrocyclic polyalkane or macrocyclic poly(alkane-co-alkene) according to any one of paragraphs XXVI to XXVIII, wherein each y is independently an integer of 1 to 5 and n is an integer of 1 to 10.

XXX. The macrocyclic polyalkane or macrocyclic poly(alkane-co-alkene) according to any one of paragraphs VIII to XXIV, further comprising C=C bridges between a plurality of macrocyclic poly(alkane-co-alkene)s to form a poly(macrocyclic poly(alkane-co-alkene)).

XXXI. The macrocyclic polyalkane or macrocyclic poly(alkane-co-alkene) according to any one of paragraphs VIII to XXIV, further comprising one or more C=C bridges between alkene repeating units of the macrocyclic poly(alkane-co-alkene)s, in the form of bi-macrocyclic, tri-macrocyclic and/or multi-macrocyclic poly(alkane-co-alkene)s.

XXXII. A method of forming a macrocyclic polyalkane or a macrocyclic poly(alkane-co-alkene) according to any one of paragraphs VIII to XXXI comprising: reacting a macrocyclic polyalkene and hydrogen in the presence of a hydrogenation catalyst to form the polyalkane or poly(alkane-co-alkene); and isolating the macrocyclic polyalkane or a macrocyclic poly(alkane-co-alkene).

XXXIII. The method of paragraph XXXII, wherein the hydrogen is provided in an amount of at least a molar equivalent of the macrocyclic polyalkene, thereby forming a polyalkane.

XXXIV. The method of paragraph XXXII, wherein the hydrogen is provided in an amount of less than a molar equivalent of the macrocyclic polyalkene, thereby forming a poly(alkane-co-alkene).

XXXV. A method of forming a macrocyclic polyalkane or a macrocyclic poly(alkane-co-alkene) according to any one of paragraphs XVII to XXIII comprising: reacting a macrocyclic poly(cycloalkene) with an excess of an alkene and an olefin metathesis catalyst thereby forming a macrocyclic poly(alkane-co-alkene) comprising vicinal —C(=CR$_2$)— groups; and optionally isolating the macrocyclic polyalkane or the macrocyclic poly(alkane-co-alkene) comprising —C(=CR$_2$)— groups.

XXXVI. The method of paragraph XXXV, further comprising: reacting the macrocyclic poly(alkane-co-alkene) comprising vicinal —C(=CR$_2$)— groups and hydrogen in the presence of a hydrogenation catalyst thereby forming a macrocyclic polyalkane or a macrocyclic poly(alkane-co-alkene) comprising isolated —C(C=CR$_2$) groups; and optionally isolating the macrocyclic polyalkane or the macrocyclic poly(alkane-co-alkene) comprising isolated —C(=CR$_2$)— groups.

XXXVII. The method according to paragraph XXXVI, further comprising: combining the macrocyclic poly(alkane-co-alkene) comprising isolated —C(=CR$_2$)— groups with an olefin metathesis catalyst; and condensing isolated —C(=CR$_2$)— groups to form a poly(macrocyclic poly(alkane-co-alkene)) comprising C=C links between macrocyclic poly(alkane-co-alkene) repeating units to form a poly(macrocyclic poly(alkane-co-alkene)); and optionally isolating the poly(macrocyclic poly(alkane-co-alkene)).

XXXVIII. The method according to paragraph XXXVII, further comprising: combining the poly(macrocyclic poly(alkane-co-alkene)) with hydrogen in the presence of a hydrogenation catalyst, thereby hydrogenating the poly(macrocyclic poly(alkane-co-alkene)) to form a poly(macrocyclic poly(alkane)).

XXXIX. The method according to paragraph XXXVI, further comprising: combining a dilute solution of the macrocyclic poly(alkane-co-alkene) comprising isolated —C(=CR$_2$)— groups with an olefin metathesis catalyst; and condensing isolated —C(=CR$_2$)— groups to form bi-macrocyclic, tri-macrocyclic and/or multi-macrocyclic poly(alkane-co-alkene)s.

XL. The method according to paragraph XXXIX, further comprising: combining the bi-macrocyclic, tri-macrocyclic and/or multi-macrocyclic poly(alkane-co-alkene)s with hydrogen in the presence of a hydrogenation catalyst, thereby hydrogenating the bi-macrocyclic, tri-macrocyclic and/or multi-macrocyclic poly(alkane-co-alkene)s to form bi-macrocyclic, tri-macrocyclic and/or multi-macrocyclic poly(alkane)s.

Definitions

As used herein, the term "alkyl" refers to straight chained and branched saturated hydrocarbon groups containing one to thirty carbon atoms, for example, one to twenty carbon atoms, or one to ten carbon atoms. The term $C_n$ means the alkyl group has "n" carbon atoms. For example, $C_4$ alkyl refers to an alkyl group that has 4 carbon atoms. $C_{1-7}$alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Nonlimiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

As used herein, the term "alkylene" refers to a bivalent saturated aliphatic radical such as an alkyl group having a substituent. For example, the term "alkylenearyl" refers to an alkyl group substituted with an aryl group. The term $C_n$ means the alkylene group has "n" carbon atoms. For example, $C_{1-6}$ alkylene refers to an alkylene group having a number of carbon atoms encompassing the entire range, as well as all subgroups, as previously described for "alkyl" groups.

As used herein, the term "alkenyl" is defined identically as "alkyl" except for containing at least one carbon-carbon double bond, and having two to thirty carbon atoms, for example, two to twenty carbon atoms, or two to ten carbon atoms. The term $C_n$ means the alkenyl group has "n" carbon atoms. For example, $C_4$ alkenyl refers to an alkenyl group that has 4 carbon atoms. $C_{2-7}$ alkenyl refers to an alkenyl group having a number of carbon atoms encompassing the entire range (i.e., 2 to 7 carbon atoms), as well as all subgroups (e.g., 2-6, 2-5, 3-6, 2, 3, 4, 5, 6, and 7 carbon atoms). Specifically contemplated alkenyl groups include ethenyl, 1-propenyl, 2-propenyl, and butenyl. Unless otherwise indicated, an alkenyl group can be an unsubstituted alkenyl group or a substituted alkenyl group.

As used herein, the term "alkynyl" is defined identically as "alkyl" except for containing at least one carbon-carbon triple bond, and having two to thirty carbon atoms, for example, two to twenty carbon atoms, or two to ten carbon atoms. The term $C_n$ means the alkynyl group has "n" carbon atoms. For example, $C_4$ alkynyl refers to an alkynyl group that has 4 carbon atoms. $C_{2-7}$ alkynyl refers to an alkynyl group having a number of carbon atoms encompassing the entire range (i.e., 2 to 7 carbon atoms), as well as all subgroups (e.g., 2-6, 2-5, 3-6, 2, 3, 4, 5, 6, and 7 carbon atoms). Specifically contemplated alkynyl groups include ethynyl, 1-propynyl, 2-propynyl, and butynyl. Unless otherwise indicated, an alkynyl group can be an unsubstituted alkynyl group or a substituted alkynyl group.

As used herein, the term "cycloalkyl" refers to an aliphatic cyclic hydrocarbon group containing three to eight carbon atoms (e.g., 3, 4, 5, 6, 7, or 8 carbon atoms). The term $C_n$ means the cycloalkyl group has "n" carbon atoms. For example, $C_5$ cycloalkyl refers to a cycloalkyl group that has 5 carbon atoms in the ring. $C_{5-8}$ cycloalkyl refers to cycloalkyl groups having a number of carbon atoms encompassing the entire range (i.e., 5 to 8 carbon atoms), as well as all subgroups (e.g., 5-6, 6-8, 7-8, 5-7, 5, 6, 7, and 8 carbon atoms). Nonlimiting examples of cycloalkyl groups include cyclopropyl, cyclobutyl, cyclopentyl, cyclohexyl, cycloheptyl, and cyclooctyl. Unless otherwise indicated, a cycloalkyl group can be an unsubstituted cycloalkyl group or a substituted cycloalkyl group. The cycloalkyl groups described herein can be isolated or fused to another cycloalkyl group, a heterocycloalkyl group, an aryl group and/or a heteroaryl group.

As used herein, the term "cycloalkenyl" is defined similarly to "cycloalkyl" except for containing at least one carbon-carbon double bond, but is not aromatic. The term $C_n$ means the cycloalkenyl group has "n" carbon atoms. For example, $C_5$ cycloalkenyl refers to a cycloalkenyl group that has 5 carbon atoms in the ring. $C_{5-8}$ cycloalkenyl refers to cycloalkenyl groups having a number of carbon atoms encompassing the entire range (i.e., 5 to 8 carbon atoms), as well as all subgroups (e.g., 5-6, 6-8, 7-8, 5-7, 5, 6, 7, and 8 carbon atoms). Nonlimiting examples of cycloalkenyl groups include cyclopropenyl, cyclobutenyl, cyclopentenyl, cyclohexenyl, cycloheptenyl, and cyclooctenyl. Unless otherwise indicated, a cycloalkenyl group can be an unsubstituted cycloalkenyl group or a substituted cycloalkenyl group.

As used herein, the term "hydroxy" or "hydroxyl" as used herein refers to the "—OH" group.

As used herein, the term "alkoxy" or "alkoxyl" refers to a "—O-alkyl" group. As used herein, the term "aryloxy" or "aryloxyl" refers to a "—O-aryl" group.

As used herein, the term "halo" is defined as fluoro, chloro, bromo, and iodo.

As used herein, the term "carboxy" or "carboxyl" refers to a "—COOH" group.

As used herein, the term "amino" refers to a —NH$_2$ or —NH— group, wherein any hydrogen can be replaced with an alkyl, cycloalkyl, or aryl group. As used herein, the term "amido" refers to an amino group that is substituted with a carbonyl moiety (e.g., —NRC(═O)O— or —OC(═O)—NR—), wherein R is a substituent on the nitrogen (e.g., alkyl or H).

As used herein, the term "ester" refers to a —RC(═O)OR— group, wherein one R is a substituent on the carbon (e.g., alkyl or aryl), and one R is a substituent on the oxygen (e.g., alkyl or aryl). As used herein, the term "ether" refers to a —ROR— group, wherein both R are substituents on the oxygen (e.g., alkyl or aryl).

As used herein, the term "aryl" refers to monocyclic or polycyclic (e.g., fused bicyclic and fused tricyclic) carbocyclic aromatic ring systems. Examples of aryl groups include, but are not limited to, phenyl, naphthyl, tetrahydronaphthyl, phenanthrenyl, biphenylenyl, indanyl, indenyl, anthracenyl, and fluorenyl. Unless otherwise indicated, an aryl group can be an unsubstituted aryl group or a substituted aryl group.

As used herein, the term "substituted," when used to modify a chemical functional group, refers to the replacement of at least one hydrogen radical on the functional group with a substituent. Substituents can include, but are not limited to, alkyl, cycloalkyl, alkenyl, cycloalkenyl, alkynyl, heterocycloalkyl, ether, polyether, thioether, polythioether, aryl, heteroaryl, hydroxyl, oxy, alkoxy, heteroalkoxy, aryloxy, heteroaryloxy, ester, thioester, carboxy, cyano, nitro, amino, amido, acetamide, and halo (e.g., fluoro, chloro, bromo, or iodo). When a chemical functional group includes more than one substituent, the substituents can be bound to the same carbon atom or to two or more different carbon atoms.

Materials and Methods

The following examples are provided for illustration and are not intended to limit the scope of the invention.

Unless otherwise specified, all manipulations were performed under an inert atmosphere using glove-box techniques. Toluene was dried using a GlassCountour drying column. Cyclohexane, 4-methyl-1-pentyne and 1-pentyne were purchased from Sigma-Aldrich, distilled over calcium hydride, degas sed by freeze pump thawing, and filtered through a column of basic alumina immediately prior to use. Dry palladium on 10% carbon was purchased from Alfa Aesar and used without any further purification. A tetraanionic pincer-ligand supported tungsten catalyst was prepared according to published procedures. See C. Roland, H. Li, K. Abboud, K. Wagener, A. Veige, Nature Chemistry 2016, 8, 791. $^1$H and $^{13}$C NMR spectra were obtained on Varian INOVA spectrometer (500 MHz). Chemical shifts, reported in δ (ppm), were referenced on the solvent, on the TMS scale for $^1$H and $^{13}$C.

Size-exclusion chromatography was performed in THF at 35° C. and a flow rate of 1.0 mL/min (Agilent isocratic pump, degas ser, and autosampler; columns: three PLgel 5 μm MIXED-D mixed bed columns, molecular weight range 200-400,000 g/mol). Detection consisted of a Wyatt Optilab rEX refractive index detector operating at 658 nm, a Wyatt miniDAWN Treos light scattering detector operating at 656 nm, and a Wyatt ViscoStar-II viscometer. Absolute molecular weights and molecular weight distributions were calculated using the Wyatt ASTRA software. Infrared spectra were collected on a Thermo Nicolet 5700 FT-IR spectrometer equipped with a single bounce, diamond-stage attenuated total reflectance (ATR) accessory.

Differential scanning calorimetry (DSC) thermograms were obtained with a DSC Q1000 (TA instruments). Typically, 4-6 mg of a sample were massed and added to a sealed pan that passed through a heat-cool-heat cycle at 10° C. min$^{-1}$. Reported data are from the second full cycle. The temperature ranged from 0 to 250° C. Thermogravimetric analyses (TGA) were measured under nitrogen with a TGA Q5000 (TA Instruments). About 10-15 mg of each sample was heated and held at 100° C. for 50-75 min. Then, 5 mg portions of these samples were heated at 20° C. min$^{-1}$ from 25 to 600° C. UV-vis spectra were obtained with Varian Cary 100 UV-Vis spectrometer (Agilent Technologies, Santa Clara, CA, USA). A spinning coater (Model No. 6204-A, Integrated technologies) was used for spinning coating. The spinning coating was done at 1000 rpm for 30 seconds with 10 seconds accelerating.

Example 1

Macrocyclic Poly(propyne) and Polypropylene

Polymerization of propyne was carried out in propyne saturated dry THF formed by bubbling propyne gas for three minutes. Injection of the tungsten catalyst, complex 4, through a septum into the reaction flask initiated the polymerization. The solution immediately turned orange with an increase in viscosity and a rise in temperature. Adding dry and oxygen free methanol after 15 minutes quenched the polymerization and precipitated the polymer, which formed a fibrous material after drying overnight. A $^1$H NMR spectrum of the polymer exhibited a broad signal from 4.6 to 6.5 ppm for the olefinic protons. The broad signal contained a maximum at 5.9 ppm and is attributable to the trans isomer protons of polypropyne. The methyl protons appeared as broad signals centered at 0.89 ppm and 1.79 ppm and a $^{13}$C{$^1$H} NMR spectrum contained a resonance at 135.1 ppm, indicative of sp$^2$ carbons. These assignments were in agreement with previous reports of linear polypropyne. Varying the ratio of monomer to catalyst led to cyclic polypropynes with molecular weights from 14 to 154 KDa.

Hydrogenation of polypropyne yielded atactic cyclic polypropylene, confirmed by $^1$H and $^{13}$C{$^1$H} NMR spectra of the hydrogenated polymers that indicated the disappearance of methine proton signals at 5.9 ppm and sp$^2$ carbon signals at 135.1 ppm, respectively. Additionally, loss of the C=C stretch at 1017 (cis) and 954 (trans) cm$^{-1}$ in the IR spectrum of further corroborated the successful hydrogenation of polypropyne.

Solution properties of cyclic polypropylene were compared with those of commercially available amorphous linear polypropylene via GPC analysis, providing evidence on the polymer cyclic topology. With a smaller hydrodynamic volume, cyclic polymers eluted later than their linear counterparts, as indicated in the plot of log MW versus elution volume shown in FIG. 1.

Figure 2:
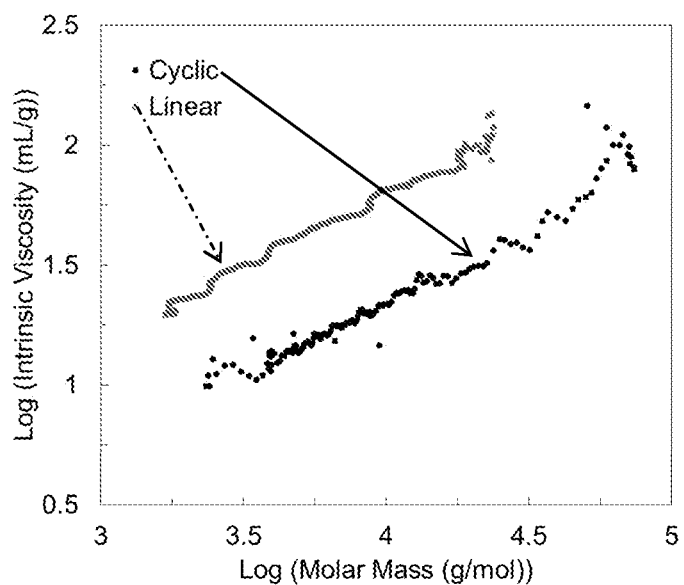
FIG. 2 is a plot of log [η] vs log M for atactic linear and cyclic polypropylene, according to an embodiment of the invention, where [η] is the intrinsic viscosity and M is the viscosity-average molar mass.

Formation of cyclic polypropylene chains is indicated in the intrinsic viscosity of cyclic vs linear polypropylene in THF using viscometer-equipped GPC. Due to their smaller overall dimensions, cyclic polymers exhibited lower intrinsic viscosity when compared with linear analogous polymers with same molecular weight, as shown in Mark-Houwink-Sakurada plot shown in FIG. 2 where log [η] was plotted vs log M, where [η] was the intrinsic viscosity and M was the viscosity-average molar mass. The experimental ratio [η]$_{cyclic}$/[η]$_{linear}$=0.34±0.03 of intrinsic viscosity was in a good agreement with theoretical ratio 0.4. The Mark-Houwink parameter observed for cyclic and linear polymers were comparable, indicating that the differences in intrinsic viscosity do not result from distinct conformations.

Typically, Tg values for linear atactic polypropylene range from −10 C to 5 C. Cyclic polypropylene displayed elevated Tg values across multiple samples with varying average molecular weights. Table 1, below, shows that atactic cyclic polypropylene had unusually high Tg's in the range of 20-52 C. Cyclic polypropylene demonstrated a solid composition rather than the oil or tacky solid displayed by atactic linear polypropylene.

TABLE 1

Glass Transition Temperatures vs Molecular Weight for Cyclic Polypropylene

| Sample # | $M_n$ | $M_w/M_n$ | $T_g$ C. |
|---|---|---|---|
| SG0474 | 11,640 | 1.31 | 45 |
| SG0520 | 28,680 | 1.34 | 28 |
| SG0525 | 34,630 | 1.83 | 46 |
| SG0534 | 40,490 | 2.94 | 20 |
| SG0535 | 37,820 | 2.74 | 32 |
| SG0536 | 43,830 | 2.70 | 52 |
| SG0541 | 47,620 | 1.90 | 25 |
| SG0542 | 36,180 | 4.61 | 28 |

Thus, Example 1 demonstrates preparation of a macrocyclic poly(alkene) and a macrocyclic poly(alkane) according to the disclosure. Example 1 further demonstrates the macrocyclic poly(alkanes) have smaller hydrodynamic volumes than commercially available amorphous linear poly (alkane)s, lower intrinsic viscosity then linear analogous polymers with the same molecular weight, and higher Tg values than linear atactic poly(alkanes).

Example 2

Macrocyclic Poly(4-methyl-1-pentene)

In an inert atmosphere glovebox, toluene (2.0 mL) and 4-methyl-1-pentyne (600 μL, 5.0 mmol) were added to a glass vial equipped with a stir bar to afford a colorless monomer solution. Injection of a stock solution of the tungsten catalyst, complex 4, in a ratio of 1700:1 to the monomer solution in one shot via a micropipette at ambient temperature initiated the polymerization. The polymerization was rapid and exothermic. The solution color changed immediately from light yellow (catalyst) to bright orange. After 30 minutes, dropwise addition of the reaction solution to tenfold excess of stirring degassed methanol resulted an orange precipitate. Vacuum filtration under argon flow followed by drying under vacuum overnight gave the cyclic poly(4-methyl-1-pentyne) (cPMPy) in 95.5% yield with a $M_n$ of $5.80 \times 10^5$ and a dispersity D of 3.76. $^1$H NMR (CDCl$_3$, 300 MHz) δ (ppm): 6.3-5.5 (b, 1H, CH=C), 2.5-1.1 (bm, 3H, CH$_2$—CH), 1.0-0.5 (b, 6H, CH$_3$). $^{13}$C NMR (CDCl$_3$, 500 MHz) δ (ppm): 140.0-122.8 (m, HC=C(C$_4$H$_9$)), 41.23 (s, CH$_2$), 27.16 (s, CH), 22.70 (s, CH$_3$).

In an inert atmosphere glove box, 365 mg cPMPy (4.5 mmol) was dissolved with 5.0 mL anhydrous cyclohexane in a 20 mL glass vial equipped with a stir bar to afford an orange viscous solution. 182 mg (50 wt % to the polymer) palladium on 10% carbon (dry) was added to the polymer solution as the hydrogenation catalyst to give a black reaction mixture. The glass vial was sealed with a rubber septum to prevent solvent leaking in the high-pressure reaction vessel. Pouching a needle through the septum allowed the hydrogen gas transfer. The vial was then transferred into a 300 mL Parr high-pressure stainless steel reaction vessel. The reaction vessel was charged with 1000 Psi H$_2$ and kept at 90° C. to initiate the hydrogenation process. Over 4-week reaction time, 15 wt % Pd/C was added to the reaction mixture every 5 days and the reaction temperature was raised slowly to 130° C. resulting in a >99% hydrogenation efficiency. After hydrogenation, the reaction mixture was filtered through a celite in a frits funnel to remove the Pd/C catalyst and give a colorless filtrate. The filtrate was concentrated and added dropwise to tenfold excess of stirring methanol to afford a white precipitate. Vacuum filtration and drying under vacuum overnight gave hydrogenated cyclic poly(4-methyl-1-pentyne) (cPMP) in a 79.6% yield with a $M_n$ of $1.49 \times 10^5$ and a dispersity D of 1.85. $^1$H NMR (300 MHz, CDCl$_3$) δ (ppm): 4.50 (s, 0.01H, CH=), 0.9-2.5 (bm, 6H, -(CH$_2$—CH)—CH$_2$—CH(CH$_3$)$_2$), 0.86 (b, 6H, CH$_3$). $^{13}$C NMR (CDCl$_3$, 500 MHz) δ (ppm): 140.0-122.8 (m, HC=C(C$_4$H$_9$)), 45.32 (s, (CH$_2$—CH)$_n$), 41.24 (s, CH$_2$—CH(CH$_3$)$_2$), 30.63 (s, (CH$_2$—CH)$_n$), 30.41 (s, CH(CH$_3$)$_2$), 22.56 (s, CH$_3$).

Static dispense spin coating technique was used to spin coat cPMP onto a glass slide. 25 mg of cPMP was dissolved in 1 mL THF providing a colorless clear solution. A clean glass slide was applied to the spin coater and then the cPMP solution was transferred onto the glass slide via a pipette. The spin coater was turned on with an accelerating period of 10 seconds from 0 to 1000 rpm and a spinning period of 30 seconds at the speed of 1000 rpm to successfully spin coat a thin film of cPMP onto the glass slide.

A UV-vis spectra for the thin film of cPMP spin coated on the glass slide was obtained via UV-Vis spectrometer with a clear glass slide as the blank reference. The UV-vis spectra revealed the absorbance of the thin film over the 300 to 800 nm region. Transferring absorbance (A) to transmittance (T) using the equation: $A = 2 - \log_{10}(\% T)$ showed the that cPMP exhibits high transparency (>95%) over the 300 to 800 nm region.

3.2020 mg cPMP was used for DSC study and it revealed that cPMP had a 5% weight loss temperature of 287.6(±0.1° C.). 2.000 mg cPMP was then submitted for TGA study and it showed that cPMP had a glass transition temperature of 39.4(±0.1° C.).

Thus, Example 2 demonstrates preparation of a macrocyclic poly(alkene) and a macrocyclic poly(alkane) according to the disclosure. Example 2 further demonstrates the ability of the macrocyclic polymers to be applied to a substrate via spin coating to provide a high transparency thin film.

Example 3

Macrocyclic poly(1-pentyne)

In an inert atmosphere glovebox, toluene (50.0 mL) and 1-pentyne (21.7 mL, 15.00 g, 0.22 mol) were added to a 250 mL round bottom flask equipped with a stir bar to afford a colorless monomer solution. 1.858 mL of tungsten catalyst, complex 4, stock solution (5.2 mg/mL) was added in a ratio of 17,500:1 to the monomer solution in one shot at ambient temperature to initiate polymerization. The polymerization was rapid and exothermic. The reaction flask became extremely hot and some of the solvent and monomer boiled away. The solution became viscous and turned into a gel in a few minutes, as well as turned from yellow (catalyst color) to orange. After 60 minutes, the polymer gel was transferred to tenfold excess of stirring degassed methanol to afford an orange sticky solid. Decanting the methanol followed by drying under vacuum overnight gave an orange sticky solid cyclic poly(1-pentyne) (cPPy) in a 70.3% yield. $^1$H NMR (CDCl$_3$, 300 MHz) δ (ppm): 5.81 (bs, 1H, CH=C), 2.23 (bs, 2H, =C—CH$_2$), 1.41 (bs, 2H, CH$_2$—CH$_3$), 0.90 (bs, 3H, CH$_3$).

In an inert atmosphere glove box, 10.20 g cyclic poly(1-pentyne) (0.15 mol) was dissolved with 130.0 mL anhydrous cyclohexane in a 300 mL beaker equipped with a stir bar to afford an orange viscous solution. 5.10 g (50 wt % to the polymer) palladium on 10% carbon (dry) was added to the polymer solution as the hydrogenation catalyst to give a black reaction mixture. The beaker was then transferred into a 300 mL Parr high-pressure stainless steel reaction vessel. The reaction vessel was charged with 1000 Psi H$_2$ and kept at 90° C. to start the hydrogenation process. Over 4-week reaction time, 15 wt % Pd/C was added to the reaction mixture every 5 days and the reaction temperature was raised slowly to 160° C. to result in a >99% hydrogenation efficiency. After hydrogenation, the reaction mixture was filtered through a celite in a frits funnel to remove the Pd/C catalyst and provide a colorless filtrate. The filtrate was concentrated and added dropwise to tenfold excess of stirring methanol to afford a white sticky solid at the bottom of the solution. Decanting the solution and drying the resulting solid under vacuum overnight gave the hydrogenated cyclic poly(1-pentene) with a $M_n$ of $2.9 \times 10^4$ and a dispersity D of 1.57. $^1$H NMR (300 MHz, CDCl$_3$) δ (ppm): 1.53-0.97 (bm, 7H, (CH$_2$—CH)—CH$_2$—CH$_2$—), 0.88 (bt, 3H, CH$_3$).

Thus, Example 3 demonstrates preparation of a macrocyclic poly(alkene) and a macrocyclic poly(alkane) according to the disclosure.

All patents referred to or cited herein are incorporated by reference in their entirety, including all figures and tables, to the extent they are not inconsistent with the explicit teachings of this specification. In case of conflict between the present disclosure and incorporated patents, publications, and references, the present disclosure should control.

It should be understood that the examples and embodiments described herein are for illustrative purposes only and that various modifications or changes in light thereof will be suggested to persons skilled in the art and are to be included within the spirit and purview of this application.

What is claimed is:

1. A macrocyclic polyalkene copolymer, comprising a conjugated polyalkene having no chain ends and in the form of a macrocycle, comprising at least two different repeating units have the structure —RC=CR— where R is independently: H; a substituted or unsubstituted $C_1$ to $C_{30}$ alkyl, provided that when all R are an unsubstituted $C_1$ to $C_{30}$ alkyl, at least one R is not a $C_4$, $C_6$, $C_7$, or $C_{13}$ alkyl; substituted or unsubstituted $C_3$ to $C_{30}$ alkenyl having one or more alkene bonds where a plurality of alkene bonds can be non-conjugated, conjugated, or a mixture thereof; or where two R groups are combined as a $C_8$-$C_{30}$ cycloalkene where the alkylene portion of the cycloalkene is substituted or unsubstituted and/or interrupted one or more times with O, NR', C(O), C(O)O, and/or C(O)NR", where R' and/or R", when present are each independently H, $C_{1\text{-}30}$ alkyl, or $C_3$ to $C_{30}$ alkenyl.

2. The macrocyclic polyalkene copolymer according to claim 1, having a structure of:

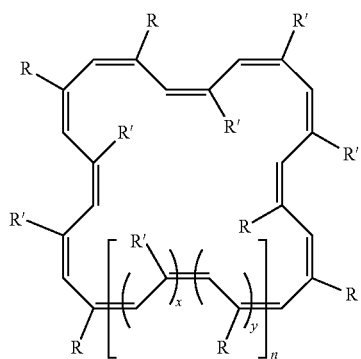

wherein R and R' in the structure are each independently an R as defined in claim 1, and each of n, x, and y is independently an integer of 1 to 100, or optionally, wherein each of n, x, and y is independently an integer of 1 to 50, or each of n, x, and y is independently an integer of 1 to 25.

3. The macrocyclic polyalkene copolymer according to claim 1, wherein each R is independently: H; a substituted or unsubstituted $C_1$ to $C_{30}$ alkyl; or a substituted or unsubstituted $C_3$ to $C_{30}$ alkenyl, or optionally, wherein each R is independently H or a substituted or unsubstituted $C_{1\text{-}3}$, $C_5$, $C_{8\text{-}12}$, or $C_{14\text{-}30}$ alkyl.

4. A macrocyclic polyalkane or macrocyclic poly(alkane-co-alkene), comprising alkane repeating units have the structure —RHC—CHR— and, optionally, alkene repeating units have the structure —RC=CR— or —C(=CR$_2$)—, where, if present, the R of the —RC=CR— alkene repeating units are the same as the R units of at least one of the alkane repeating units, and where R is independently: H; a substituted or unsubstituted $C_1$ to $C_{30}$ alkyl, or, when absent an alkene repeating unit or comprising exclusively one unsubstituted alkane repeating units or a copolymer with —H$_2$C—CH$_2$— repeating units, R is $C_{1\text{-}3}$, $C_5$, $C_{8\text{-}12}$, or $C_{14\text{-}30}$, substituted or unsubstituted $C_3$ to $C_{30}$ alkenyl having one or more alkene bonds where a plurality of alkene bonds can be non-conjugated, conjugated, or a mixture thereof; or where two R groups are combined as a $C_8$-$C_{30}$ cycloalkane and/or cycloalkene where the alkylene portion of the cycloalkane and/or alkene is substituted or unsubstituted and/or interrupted one or more times with O, NR', C(O), C(O)O, and/or C(O)NR", where R' and/or R", when present, are each independently H, $C_{1\text{-}30}$ alkyl, $C_3$ to $C_{30}$ alkenyl.

5. The macrocyclic polyalkane or macrocyclic poly(alkane-co-alkene) according to claim 4, having a structure of

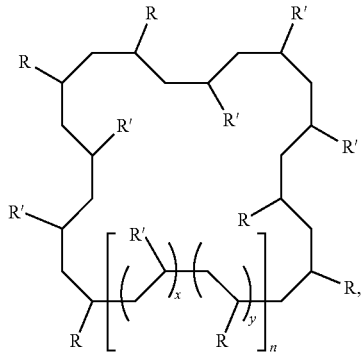

wherein R and R' in the structure are each independently an R as defined in claim 4, and each of n, x, and y is an integer of 1 to 100, or optionally, wherein each of n, x, and y is independently an integer of 1 to 50, or each of n, x, and y is independently an integer of 1 to 25.

6. The macrocyclic polyalkane or macrocyclic poly(alkane-co-alkene) according to claim 4, wherein each R is independently: H; a substituted or unsubstituted $C_1$ to $C_{30}$ alkyl; or a substituted or unsubstituted $C_3$ to $C_{30}$ alkenyl; provided that when all R are an unsubstituted $C_1$ to $C_{30}$ alkyl, at least one R is not a $C_4$, $C_6$, $C_7$, or $C_{13}$ alkyl, or optionally, wherein each R is independently H or a substituted or unsubstituted $C_{1\text{-}3}$, $C_5$, $C_{8\text{-}12}$, or $C_{14\text{-}30}$ alkyl.

7. The macrocyclic polyalkane or macrocyclic poly(alkane-co-alkene) according to claim 4, wherein the macrocyclic polyalkane has $C_8$-$C_{30}$ cycloalkane repeating units, or optionally wherein the macrocyclic polyalkane is macrocyclic polypropylene.

8. The macrocyclic polyalkane or macrocyclic poly(alkane-co-alkene) according to claim 4, wherein the macrocyclic poly(alkane-co-alkene) comprises vicinal —C(=CR$_2$)— groups.

9. The macrocyclic polyalkane or macrocyclic poly(alkane-co-alkene) according to claim 8, having a structure

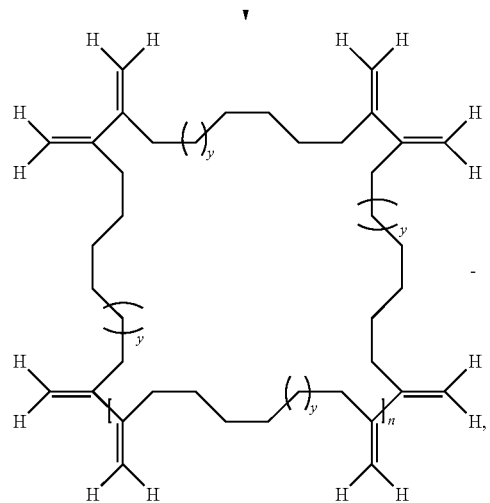

wherein the H atoms depicted in the structure can be H or another R group as defined in claim 8, and each of n and y is an integer of 1 to 100, or optionally, wherein each y is independently an integer of 1 to 20 and n is an integer of 1 to 50, or each y is independently an integer of 1 to 10 and n is an integer of 1 to 25, or each y is independently an integer of 1 to 5 and n is an integer of 1 to 10.

10. The macrocyclic polyalkane or macrocyclic poly (alkane-co-alkene) according to claim 4, wherein the macrocyclic polyalkane or macrocyclic poly(alkane-co-alkene) comprises vicinal —C(CHR$_2$)— groups.

11. The macrocyclic polyalkane or macrocyclic poly (alkane-co-alkene) according to claim 9, wherein each R is independently: H; a substituted or unsubstituted C$_1$ to C$_{30}$ alkyl; or a substituted or unsubstituted C$_3$ to C$_{30}$ alkenyl, or optionally, wherein each R is independently H or a substituted or unsubstituted C$_{1-3}$, C$_5$, C$_{8-12}$, or C$_{14-30}$ alkyl.

12. The macrocyclic polyalkane or macrocyclic poly (alkane-co-alkene) according to claim 9, wherein the macrocyclic polyalkane has C$_8$-C$_{30}$ cycloalkane repeating units in the polymer backbone.

13. The macrocyclic polyalkane or macrocyclic poly (alkane-co-alkene) according to claim 12 having a structure:

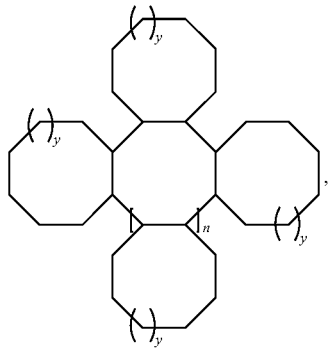

wherein each y and n are independently integers from 1 to 100, or optionally, wherein each y is independently an integer of 1 to 20 and n is an integer of 1 to 50, or each y is independently an integer of 1 to 10 and n is an integer of 1 to 25, or each y is independently an integer of 1 to 5 and n is an integer of 1 to 10.

14. The macrocyclic polyalkane or macrocyclic poly (alkane-co-alkene) according to claim 4, further comprising C═C bridges between a plurality of macrocyclic poly (alkane-co-alkene)s to form a poly(macrocyclic poly(alkane-co-alkene)), or one or more C═C bridges between alkene repeating units of the macrocyclic poly(alkane-co-alkene)s, in the form of bi-macrocyclic, tri-macrocyclic and/or multi-macrocyclic poly(alkane-co-alkene)s.

15. A method of forming a macrocyclic polyalkane or a macrocyclic poly(alkane-co-alkene) according to claim 4 comprising:
reacting a macrocyclic polyalkene and hydrogen in the presence of a hydrogenation catalyst to form the polyalkane or poly(alkane-co-alkene); and
isolating the macrocyclic polyalkane or a macrocyclic poly(alkane-co-alkene).

16. The method of claim 15, wherein the hydrogen is provided in an amount of at least a molar equivalent of the macrocyclic polyalkene, thereby forming a polyalkane, or the hydrogen is provided in an amount of less than a molar equivalent of the macrocyclic polyalkene, thereby forming a poly(alkane-co-alkene).

17. A method of forming a macrocyclic polyalkane or a macrocyclic poly(alkane-co-alkene) according to claim 8 comprising:
reacting a macrocyclic poly(cycloalkene) with an excess of an alkene and an olefin metathesis catalyst thereby forming a macrocyclic poly(alkane-co-alkene) comprising vicinal —C(═CR$_2$)— groups; and
optionally isolating the macrocyclic polyalkane or the macrocyclic poly(alkane-co-alkene) comprising —C(═CR$_2$)— groups.

18. The method of claim 17, further comprising:
reacting the macrocyclic poly(alkane-co-alkene) comprising vicinal —C(═CR$_2$)— groups and hydrogen in the presence of a hydrogenation catalyst thereby forming a macrocyclic polyalkane or a macrocyclic poly(alkane-co-alkene) comprising isolated —C(C═CR$_2$) groups; and
optionally isolating the macrocyclic polyalkane or the macrocyclic poly(alkane-co-alkene) comprising isolated —C(═CR$_2$)— groups.

19. The method according to claim 18, further comprising:
combining the macrocyclic poly(alkane-co-alkene) comprising isolated —C(═CR$_2$)— groups with an olefin metathesis catalyst; and
condensing isolated —C(═CR$_2$)— groups to form a poly(macrocyclic poly(alkane-co-alkene)) comprising C═C links between macrocyclic poly(alkane-co-alkene) repeating units to form a poly(macrocyclic poly (alkane-co-alkene)); and
isolating the poly(macrocyclic poly(alkane-co-alkene)), and optionally,
combining the poly(macrocyclic poly(alkane-co-alkene)) with hydrogen in the presence of a hydrogenation catalyst, thereby
hydrogenating the poly(macrocyclic poly(alkane-co-alkene)) to form a poly(macrocyclic poly(alkane)).

20. The method according to claim 18, further comprising:
combining a dilute solution of the macrocyclic poly (alkane-co-alkene) comprising isolated —C(═CR$_2$)— groups with an olefin metathesis catalyst; and
condensing isolated —C(═CR$_2$)— groups to form bi-macrocyclic, tri-macrocyclic and/or multi-macrocyclic poly(alkane-co-alkene)s, and optionally, combining the bi-macrocyclic, tri-macrocyclic and/or multi-macrocyclic poly(alkane-co-alkene)s with hydrogen in the presence of a hydrogenation catalyst, thereby hydrogenating the bi-macrocyclic, tri-macrocyclic and/or multi-macrocyclic poly(alkane-co-alkene)s to form bi-macrocyclic, tri-macrocyclic and/or multi-macrocyclic poly(alkane)s.

\* \* \* \* \*

UNITED STATES PATENT AND TRADEMARK OFFICE
CERTIFICATE OF CORRECTION

PATENT NO. : 11,807,694 B2
APPLICATION NO. : 16/648159
DATED : November 7, 2023
INVENTOR(S) : Adam S. Veige It is certified that error appears in the above-identified patent and that said Letters Patent is hereby corrected as shown below:

On the Title Page

At item (54), and in the Specification, Column 1, Line 1, "POLY(AKANE)S" should be
-- POLY(ALKANE)S --.

In the Claims

At Column 27, Line 61, "$C_{14-30}$," should be -- $C_{14-30}$; --.

At Column 28, Line 4, "structure of" should be -- structure of: --.

At Column 28, Line 44, "structure" should be -- structure: --.

Signed and Sealed this
Fourth Day of June, 2024

Katherine Kelly Vidal
*Director of the United States Patent and Trademark Office*